United States Patent [19]

Huang

[11] Patent Number: 5,016,512
[45] Date of Patent: May 21, 1991

[54] SCROLL SAW BLADE HOLDING SYSTEM

[76] Inventor: Chun-Chi Huang, Taiwan Sakura Corporation, 11th Fl., No. 2 Taichung Kang Rd., Sec. 1, Tai-chung, Taiwan

[21] Appl. No.: 459,907

[22] Filed: Jan. 2, 1990

[51] Int. Cl.$^5$ .............................................. B27B 19/02
[52] U.S. Cl. ........................................ 83/783; 83/786; 83/581.1; 83/662; 83/698
[58] Field of Search .................. 83/781–786, 83/662, 581.1, 697, 698, 752; 30/392–394; 403/121; 384/3, 6

[56] References Cited

U.S. PATENT DOCUMENTS

| | | | |
|---|---|---|---|
| Re. 32,020 | 11/1985 | Abel | 83/783 |
| 2,611,663 | 9/1952 | Foster | 403/121 |
| 2,692,622 | 10/1954 | Heese | 83/782 |
| 3,103,390 | 9/1963 | Hale | 384/6 |
| 4,455,909 | 6/1984 | Wilbs | 83/662 X |
| 4,503,742 | 3/1985 | Sutton | 83/781 |
| 4,670,986 | 6/1987 | Chen | 30/392 |
| 4,681,006 | 7/1987 | Miller | 83/782 |
| 4,807,507 | 2/1989 | Rice et al. | 83/783 |
| 4,838,138 | 6/1989 | Rice et al. | 83/698 |
| 4,841,823 | 6/1989 | Brundage | 83/781 |

Primary Examiner—Frank T. Yost
Assistant Examiner—Eugenia A. Jones
Attorney, Agent, or Firm—Thompson, Hine and Flory

[57] ABSTRACT

A scroll saw blade holding system comprises at least an upper scroll saw arm with a notched, forked end, a pair of plate members held together by a screw for clamping an end of a scroll saw blade, and a pivot pin, extending through the plate members and shaped to rest within the notch in the scroll saw arm. The pin preferably includes a longitudinally-extending, knife edge pivot point which allows the plate members and blade to pivot relative to the scroll saw arm. Also in a preferred embodiment, a blade retaining assembly is included and comprises a bracket attached to the saw arm and a lock knob and bolt positioned above the plate members for retaining the pin within the notch.

15 Claims, 1 Drawing Sheet

SCROLL SAW BLADE HOLDING SYSTEM

BACKGROUND OF THE INVENTION

The present invention relates to scroll saws and, more particularly, to blade holder systems for use with scroll saws which allow the blade to be removed and replaced easily.

Many designs have been developed for attaching a blade to a scroll saw such that the blade can be removed and replaced easily. For example, Brundage U.S. Pat. No. 4,841,823 discloses a scroll saw which uses a blade having mounting pins pressed through its upper and lower ends. The mounting pins fit within notches formed in upper and lower blade holder clips. The blade holder clips are positionable relative to the scroll saw arms to effect alignment of the blade.

Rice et al. U.S. Pat. Nos. 4,807,507 and 4,838,138 disclose a scroll saw in which the upper end of the blade is clamped between plate members that are held together by cap screw. The plate members are attached to the upper scroll saw arm by a pin which is pressed through the arm and one of the plate members. The plate member not supporting the pin is maintained in proper orientation by the clamping screw and a locating pin.

The lower end of the blade is clamped between two cylindrical members which, in turn, are retained within a tubular segment. The tubular segment is held in position within a notch in the lower arm by a clip, and includes a slot through which the lower blade end passes to be clamped by the cylindrical members.

Chen U.S. Pat. No. 4,670,986 discloses a blade holder system comprising upper and lower U-shaped clamping members which receive cap screws that are tightened so that the legs of the U-shaped members clamp the ends of the saw blade. The ends of the U-shaped clamping members are pointed and notched so that the members may engage pins mounted on the upper and lower scroll saw arms.

Sutton U.S. Pat. No. 4,503,742 discloses a scroll saw in which the blade ends are held between clamping plates joined by a machine screw. The clamping plates include knife edges which rest and pivot within corresponding notches formed on the upper and lower blade arms. The scroll saw of the Sutton patent also includes a blade retaining member comprising a bracket extending over the top of the upper clamping members and a knobbed mounting screw for attaching the blade holding bracket to the upper arm and adjusting the gap between the bracket and the upper clamping members.

SUMMARY OF THE INVENTION

The present invention is a blade holding system for a scroll saw which comprises at least one scroll saw arm having a notched, forked end, a pair of plate members for clamping an end of a scroll saw blade, and a blade holder strut or pin, spaced from the blade, attached to and extending from the plate members and being shaped to be received within the notches of the arm. The pin engages the notches to form a pivotable connection between a blade retained by the plate members and the scroll saw arm. When the system is assembled, the blade and plate members extend between the fingers of the forked end.

In a preferred embodiment, both the upper and lower scroll saw arms include such an assembly. The blade assembly, comprising the blade, plate members and pin, can be attached to or removed from the associated scroll saw arm simply by loosening the blade tensioning assembly and placing the pin in the notches of the arm, or removing the pin from the notches.

The plate members are held in clamping relation relative to the blade end by a cap screw, and the screw is loosened to release the blade end from the plate members. The pin preferably is machined to form a knife edge which engages the notches formed in the associated scroll saw arm end. This knife edge engagement minimizes the friction occurring during the pivoting movement of the blade relative to the scroll saw arm during operation of the scroll saw.

In a preferred embodiment, the upper arm includes a blade retainer which comprises a bracket attached to the arm and extending outwardly above the members clamping the upper end of the saw blade. A retaining screw is threaded through the bracket above the plate members and can be positioned toward and away from them to prevent the plate members from separating from the arm, or to facilitate removal of the plate members from the arm.

The preferred embodiment also includes a gasket which is positioned on the end of the arm and lies between the pin and forked end of the arm. The gasket reduces wear on the arm by the hardened pin and provides a smooth bearing surface for the pin.

Accordingly, it is an object of the present invention to provide a blade holding system which facilitates the attachment of a blade to a scroll saw and the removal of a blade therefrom; a blade holding system which minimizes the likelihood of the blade inadvertently becoming separated from the scroll saw arms; a blade holding system which allows the blade to pivot freely relative to the upper and lower arms; and a blade holding system which is relatively simple to assemble.

Other objects and advantages of the invention will be apparent from the following description, the accompanying drawings and the appended claims.

DETAILED DESCRIPTION OF THE PREFERRED EMBODIMENT

Figure 1:
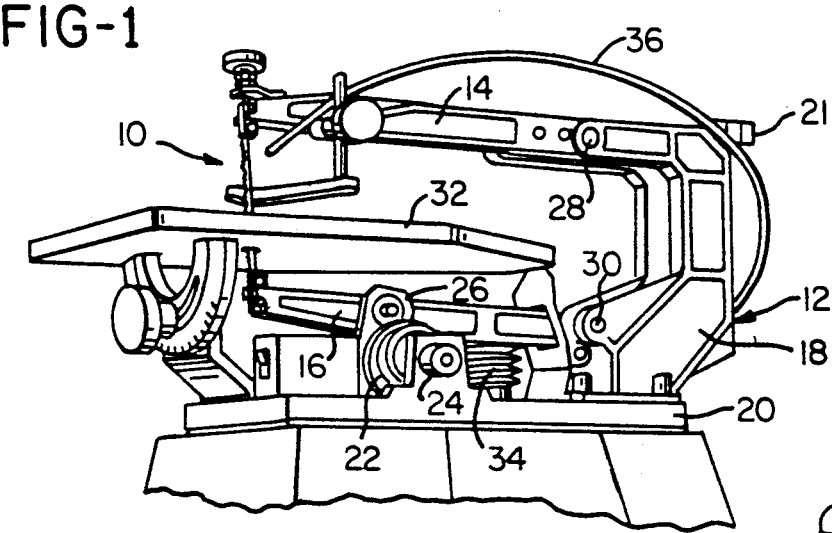
FIG. 1 is a perspective, somewhat schematic view of a scroll saw incorporating a preferred embodiment of the blade holding system of the present invention.

As shown in FIG. 1, the scroll saw blade holding system of the present invention, generally designated 10, is designed to be mounted on a scroll saw 12 which is otherwise of conventional design. An example of such a scroll saw design is shown in Brundage U.S. Patent No. 4,841,823, the disclosure of which is incorporated herein by reference.

Such scroll saws are of the "parallel arm" type and include upper and lower arms 14, 16, respectively, which are pivotably attached to a frame 18 which, in turn, is bolted to a base 20. The blade holding system 10 is attached to the ends of arms 14, 16 and is held under proper tension by a tensioning assembly (not shown) of conventional design which includes a tensioning knob 21. The base 20 supports a motor (not shown) which turns a pulley 22 mounted on pillow block bearings 24 attached to the base. The pulley drives a link arm 26 which is rotatably attached to the lower arm 16.

In operation, the motor rotates the pulley 22 which causes the link arm 26 to reciprocate and results in the upper and lower arms pivoting about connections 28, 30, respectively. This causes the upper and lower arms to reciprocate the blade holding system 10 relative to an adjustable table 32. The rocking action of the lower arm 16 also acts to actuate a bellows 34 which pumps air along a flexible plastic tube 36 that terminates at the blade holder system 10 above the table 32 in order to blow away saw dust created during a sawing operation.

Figure 2:
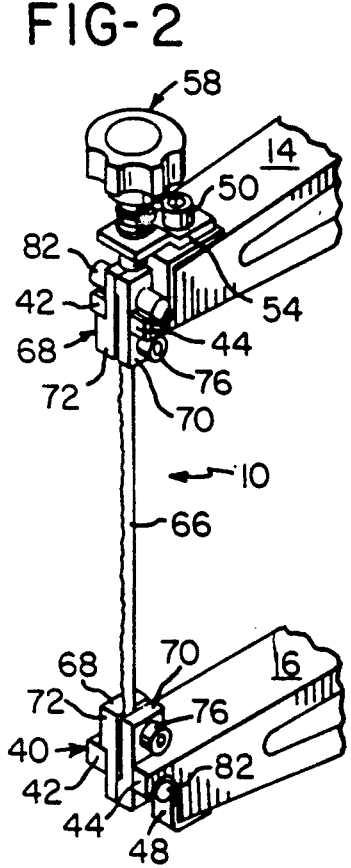
FIG. 2 is a detail of the scroll saw of FIG. 1 showing, in perspective, the blade holding system.
Figure 3:
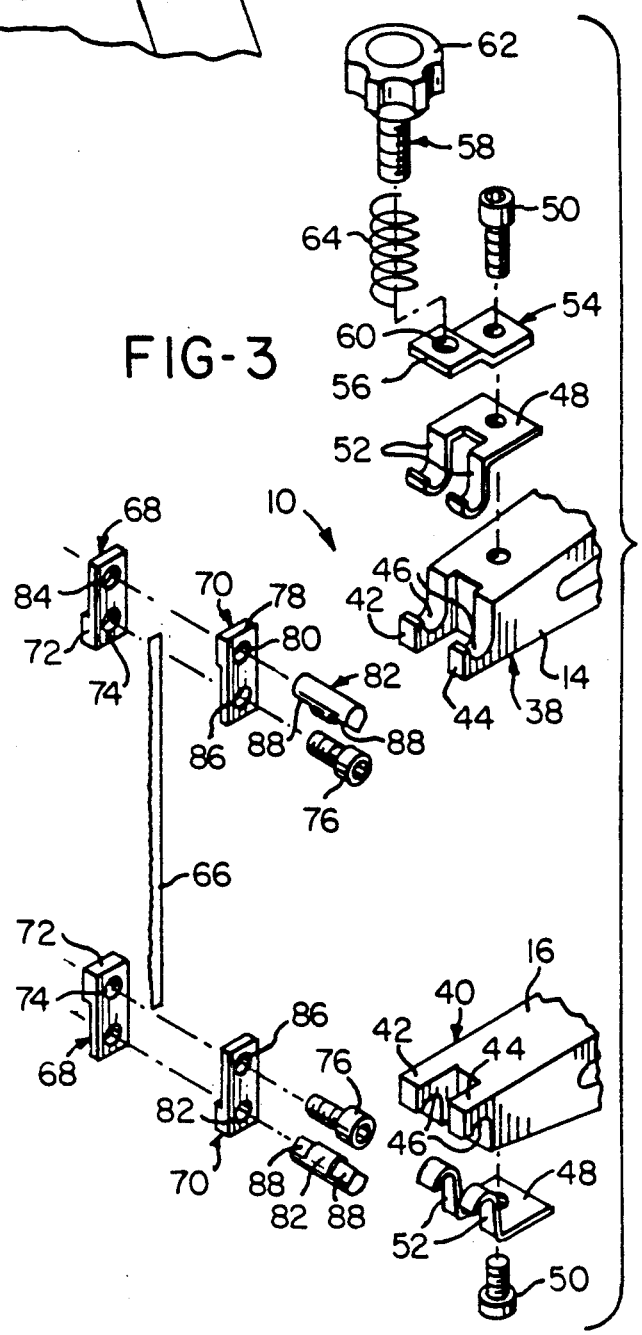
FIG. 3 is an exploded, perspective view of the detail of FIG. 2.

As shown in FIGS. 2 and 3, the blade holder system 10 includes the upper and lower arms 14, 16 having notched, forked ends 38, 40. Each of the ends 38, 40 includes a pair of spaced fingers 42, 44 forming the fork, and each finger includes a rounded notch 46 formed in a side facing away from the table 32 (see FIG. 1).

The upper and lower arms 14, 16 also include blade holder gaskets 48 which are attached to the arms by cap screws 50. The gaskets 48 include segments 52 shaped to extend along the notches 46 in the ends 38, 40.

The upper arm 14 also includes a blade retaining bracket assembly 54. The bracket assembly 54 includes a bracket member 56, attached to the upper arm 14 by a cap screw 50, and a bolt 58 which is threaded through a hole 60 in the bracket member. The bolt 58 also includes a knob 62 and a coil extension spring 64 about its shank. The extension spring is captured between the underside of the knob 62 and the bracket member 56 and exerts pressure on the bolt 58 to prevent it from coming loose and changing its position during operation of the scroll saw 12 (FIG. 1). The bracket assembly extends outwardly from the arm 14 above the notched, forked end 38 such that the bracket member 56 and bolt 58 are directly above the gap between the fingers 42, 44 of the end 38.

A scroll saw blade 66 is clamped at its upper and lower ends by pairs of plate members 68, 70. Plate members 68 each include an outer offset 72 which has a threaded hole 74 for receiving a cap screw 76. Plate members 70 each include an inner offset 78 which includes a hole 80 that receives a pivot pin or strut 82 that also passes through hole 84 of plate member 68. Holes 80, 84 are sized to receive their respective pins 82 in an interference fit which joins the plate members 68, 70 together. Cap screws 76 pass through smooth-bored holes 86 so that the clamping members 70 can be tightened and loosened relative to the clamping members 68 by adjustment of the cap screws 76. The pins 82 include knife-edged or inverted V shape segments 88 on opposite ends thereof which are aligned with each other. The pins are oriented within the clamping members 68, 70 such that the knife edges 88 engage the arcuate portions of the segments 52 of the gaskets 48—lining the notches 46—when the blade holding system 10 is assembled as shown in FIG. 2. This arrangement allows the pins 82 to pivot about a knife-edged bearing during operation, which minimizes friction.

The inner offset portions 78 of the plate members 70 are sized to approximate the thickness of the saw blade 66. When the saw blade is clamped between the plate members 68, 70, as shown in FIG. 2, the members are thus aligned substantially parallel to each other and to the saw blade.

To mount a blade 66, the upper and lower pairs of plate members 68 and 70 are adjusted by backing off their respective cap screws 76. The blade 66 is then attached to the plate members 68, 70 by placing its ends between the plate members, preferably such that the upper and lower tips of the blade abut the inner offset portions 78. The cap screws 76 are then tightened down on the plate members 68, 70, thereby pinching the upper and lower ends of the blade between them. It is desirable to align the blade 66 parallel to a longitudinal centerline of the plate members. The blade 66 and clamping members 68, 70 are now ready for attachment to the blade arms 14, 16.

The arms 14, 16 are brought closer to each other by adjusting a tension knob 21 (see FIG. 1) which causes the arms to pivot about connections 28, 30 so that ends 38, 40 approach each other slightly. This allows the plate members to be attached to the ends of the arms 14, 16 such that pins 82 rest within the notches 46 of the arms and the plate members are positioned between the fingers 42, 44 of each arm. As shown in FIG. 2, the offset portions 72 of members 68 are shaped to provide clearance around fingers 42.

The blade retaining bracket assembly 54 is adjusted by tightening down the bolt 58 so that it is drawn closer to the plate members 68, 70 engaging the upper arm 14. This prevents the pin 82 from disengaging from the notches 46 of the upper arm 14. The final step in attaching the blade holding system 10 is to tighten the tension knob 21 to impart an appropriate level of tension to the blade 66. Removal of the blade simply requires a reversal of the aforementioned steps.

The construction of the preferred embodiment allows the system 10 to be fabricated such that the plate members are made of a relatively mild steel. The gaskets 54 preferably are made of a spring steel and the pins 82 preferably are made of a hardened, wear-resistant steel.

While the form of apparatus herein described constitutes a preferred embodiment of the invention, it is understood that the invention is not limited to this precise form of apparatus, and that changes may be made herein without departing from the scope of the invention.

What is claimed is:

1. A blade holding system for a scroll saw comprising:
   a scroll saw arm having a forked end, which includes a notch opening away from a table of an associated scroll saw;
   plate means for clamping an end of a scroll saw blade;
   means for releasably attaching said plate means to said blade; and
   pin means, spaced from said blade, attached to and extending from said plate means and being shaped to be received in said notch whereby said pin means and said notch engage to form a pivotable connection between a blade retained by said plate means and said arm.

2. The blade holding system of claim 1 wherein said pin means is shaped to include a longitudinal edge engaging said notch.

3. The blade holding system of claim 1 further comprising gasket means, positioned between said pin means and said notch, for reducing wear of said arm at said notch and for providing a smooth surface for said pin means.

4. The blade holding system of claim 3 wherein said pin means includes a lower surface having an inverted V shape; and said notch and said gasket means have arcuate shapes receiving said lower surface in a nested relation.

5. The blade holding system of claim 1 further comprising means for retaining said pin means in engagement with said notch.

6. The blade holding system of claim 5 wherein said retaining means includes a blade holder bracket attached to said arm and extending outwardly therefrom over said notch and said plate means.

7. The blade holding system of claim 6 wherein said retaining means includes a bolt attached to and positionable relative to said blade holder bracket.

8. The blade holding system of claim 7 wherein said bolt includes a shank engaging said blade holder bracket above said plate means and displaceable toward and away from said plate means to provide a retaining and releasing function, respectively.

9. The blade holding system of claim 1 wherein said plate means includes first and second plate members.

10. The blade holding system of claim 9 wherein said pin means extends through and joins together said plate members at one end thereof, and said pin means extends sidewardly therefrom.

11. The blade holding systems of claim 10 wherein said attaching means includes a screw slidably extending through said first plate member and being threaded into said second plate member to clamp a blade between said first and second plate members.

12. The blade holding system of claim 11 wherein said second plate member includes an offset portion shaped such that said offset portion and said first plate member fit within said forked end, said pin means extending through an end opposite said offset portion.

13. The blade holding system of claim 12 wherein said screw extends through said plate members at said offset portion and at an end opposite said pin means.

14. A blade holding system for a scroll saw comprising:
- at least one scroll saw arm having a notched, forked end, said end including spaced fingers, each of said fingers, including a notch opening away from a table of an associated scroll saw;
- first and second plate members for clamping a saw blade therebetween;
- a pin pressed through said plate members at one end thereof, said pin including a knife-edged segment engaging said notches;
- gasket means between said pin and said arm and positioned within said notches to provide a bearing surface for said pin;
- means for retaining said pin within said notches such that said plate members extend between said fingers; and
- screw means for selectively clamping a saw blade between said plate members.

15. The blade holder of claim 14 wherein said retaining means includes a bracket member attached to and extending outwardly from said arm over said forked end and said plate members; and bolt means threaded through said bracket member superposed to said plate members wherein said bolt means is positionable toward and away from said plate members to retain and release, respectively, said pin from engagement with said notches.

* * * * *